(12) United States Patent
Benson

(10) Patent No.: US 7,966,809 B2
(45) Date of Patent: Jun. 28, 2011

(54) SINGLE-PIECE HYBRID ROCKET MOTOR

(75) Inventor: Jim Benson, Poway, CA (US)

(73) Assignee: Spacedev, Inc., Poway, CA (US)

( * ) Notice: Subject to any disclaimer, the term of this patent is extended or adjusted under 35 U.S.C. 154(b) by 1019 days.

(21) Appl. No.: 11/668,829

(22) Filed: Jan. 30, 2007

(65) Prior Publication Data

US 2007/0261386 A1    Nov. 15, 2007

Related U.S. Application Data

(60) Provisional application No. 60/764,396, filed on Feb. 1, 2006.

(51) Int. Cl.
*F02K 9/72* (2006.01)
*F02K 9/24* (2006.01)

(52) U.S. Cl. ............... 60/251; 60/253; 102/287

(58) Field of Classification Search ............. 60/251, 60/253, 254; 102/287, 291
See application file for complete search history.

(56) References Cited

U.S. PATENT DOCUMENTS

| | | | | |
|---|---|---|---|---|
| 3,032,970 A | * | 5/1962 | Fox | 60/253 |
| 3,280,566 A | * | 10/1966 | Larue | 60/253 |
| 3,298,182 A | | 1/1967 | Webb | |
| 3,354,647 A | | 11/1967 | Aycock | |
| 3,434,426 A | * | 3/1969 | De Dapper | 102/291 |
| 3,447,326 A | | 6/1969 | Fuller | |
| 3,507,296 A | | 4/1970 | Fix et al. | |
| 3,555,824 A | | 1/1971 | Buse et al. | |
| 3,715,888 A | * | 2/1973 | Massie | 60/251 |
| 3,812,671 A | * | 5/1974 | Burr et al. | 60/253 |
| 4,023,355 A | * | 5/1977 | McDonald | 60/254 |
| 4,424,679 A | | 1/1984 | Holzman | |
| 4,787,202 A | * | 11/1988 | Crapiz | 60/253 |
| 4,802,333 A | | 2/1989 | Smith | |
| 4,880,185 A | | 11/1989 | Apfel | |
| 5,026,259 A | | 6/1991 | Whitehead et al. | |
| 5,119,627 A | | 6/1992 | Bradford et al. | |
| 5,579,636 A | | 12/1996 | Rosenfield | |
| 5,582,001 A | | 12/1996 | Bradford et al. | |
| 5,694,769 A | | 12/1997 | Akiba et al. | |
| 6,016,652 A | * | 1/2000 | Smith et al. | 60/251 |
| 6,092,366 A | | 7/2000 | Smith et al. | |
| 6,354,074 B1 | | 3/2002 | Jones et al. | |
| 6,393,830 B1 | | 5/2002 | Hamke et al. | |
| 6,679,047 B1 | | 1/2004 | Uematsu et al. | |
| 6,880,326 B2 | | 4/2005 | Karabeyoglu et al. | |
| 7,069,717 B2 | | 7/2006 | Macklin et al. | |
| 2002/0121081 A1 | | 9/2002 | Cesaroni et al. | |
| 2006/0064963 A1 | | 3/2006 | Macklin et al. | |
| 2006/0213181 A1 | | 9/2006 | Sarigul-Klijn et al. | |

OTHER PUBLICATIONS

Space Daily "Surrey fires micro electric thruster" Oct. 25, 1999 http://www.spacedaily.com/news/microsat-99j.html. Williams et al. "Almost There: Responsive Space" AIAA 2nd Responsive Space Conference 2004 RS2-2004-8000; Apr. 19-22, 2004; Los Angeles, CA.

* cited by examiner

*Primary Examiner* — Ted Kim
(74) *Attorney, Agent, or Firm* — Fred C. Hernandez; Mintz, Levin, Cohn, Ferris, Glovsky and Popeo P.C.

(57) ABSTRACT

A hybrid rocket motor is formed from a single piece of material, such as, for example, by extrusion or injection molding. The rocket motor includes various components, such as casing, structure, oxidizer tank, combustion chamber, fuel, port and nozzle that are all formed from a single piece of material. The material can be, for example, a material that can be used as solid rocket fuel.

6 Claims, 2 Drawing Sheets

-- Prior Art --

SINGLE-PIECE HYBRID ROCKET MOTOR

REFERENCE TO PRIORITY DOCUMENT

This application claims priority of co-pending U.S. Provisional Patent Application Ser. No. 60/764,396, filed Feb. 1, 2006. Priority of the aforementioned filing date is hereby claimed and the disclosure of the Provisional Patent Application is hereby incorporated by reference in its entirety.

BACKGROUND

This disclosure relates to propulsion systems, and more particularly to a hybrid propulsion system.

Liquid systems and solid systems are the two basic types of rocket propulsion systems that are generally used in the rocket industry. In a solid propellant system, solid rocket fuel and an oxidizer are mixed together and allowed to cure inside a rocket case to form a solid propellant material, which is then ignited in the rocket case. Upon ignition, pressure forms within the rocket case and gases are released through a nozzle to produce thrust. In a solid propellant system, the solid propellant burns uninterrupted until all the propellant is exhausted, which can be undesirable in certain circumstances.

Solid systems can be quite complicated, and are subject to several requirements during manufacture in order to minimize safety risks during use. For example, the solid propellant must be crack-free, as propellant grains which contain cracks present a risk of explosive failure of the vehicle. Solid propellant systems can be inadvertently ignited by mechanical shock and static electricity. Consequently, the manufacturing process requires extreme safety precautions, which increases manufacturing costs.

In a liquid system, a liquid oxidizer is fed into a combustion chamber in combination with a liquid fuel. The oxidizer and liquid fuel are mixed in the combustion chamber, where they react to produce gases under high temperature and high pressure. The gases exhaust through a nozzle from the combustion chamber to thereby produce thrust. Although widely used, there are certain drawbacks associated with liquid propulsion systems.

One such drawback is that the mixing of reactants requires a high performance pressurization system for the fuel and oxidizer, which can contribute to a high cost with respect to both money and maintenance. Like solids, a liquid system can also explode since the oxidizer and fuels can be inadvertently mixed together. Another drawback is that exotic—and therefore expensive—materials must be used for the various components of the system, which increases the monetary cost of the systems.

Another type of rocket propulsion system are the hybrid systems, which are generally not as widely used as liquid and solid rocket fuel systems. A hybrid system combines aspects of both liquid systems and solid systems in that one propellant is stored as a solid and another propellant is stored as a liquid. In a typical system, the solid material is used as the fuel and the liquid material is used as the oxidizer. A variety of materials can be used as the fuel, including Plexiglas (polymethyl methacrylate (PMMA)), high density polyethylene (HDPE), hydroxyl terminated polybutadiene (HTPB), etc. Nitrous Oxide is a commonly used as the oxidizer, although other oxidizers can be used.

Hybrid systems have characteristics that can be highly desirable for certain situations and uses. For example, a hybrid system generally has higher specific impulse than solid systems. Specific impulse is the change in momentum per unit mass for the rocket fuel. Thus, a hybrid system can generate a high level of "push" for each unit of fuel that is used. Another advantage associated with hybrid propulsion systems is the complete separability of the fuel from the principal oxidizer. This inhibits the potential for inadvertent ignition or catastrophic failure so that hybrid systems are inherently immune to inadvertent explosion. Yet another advantage is that hybrid systems have the ability to easily start, stop, and restart the combustion of the rocket fuel.

There is currently a need for improved hybrid propulsion systems.

SUMMARY

Disclosed is a hybrid rocket motor formed from a single piece of material, such as, for example, by extrusion or injection molding. The rocket motor includes various components, such as casing, structure, oxidizer tank, combustion chamber, fuel, port and nozzle that are all formed from a single piece of material. The material can be, for example, a material that can be used as solid rocket fuel.

In one aspect, there is disclosed a hybrid rocket system, comprising: a motor case having a proximal end and a distal end, the motor case defining an interior volume including a combustion chamber at the proximal end, the motor case having a first nozzle at the distal end, the motor case further defining a combustion port between the combustion chamber and the nozzle; a fuel tank coupled to the proximal end of the motor case, the fuel tank defining an internal volume configured to hold a fluid oxidizer; and a valve port between the fuel tank and the combustion chamber, the valve port providing communication between the internal volume of the fuel tank and the combustion chamber; wherein the motor case, the fuel tank, and the valve port are all formed of the same material and wherein the material is a solid rocket fuel.

Other features and advantages will be apparent from the following description of various embodiments, which illustrate, by way of example, the principles of the disclosed devices and methods.

DETAILED DESCRIPTION

Figure 1:
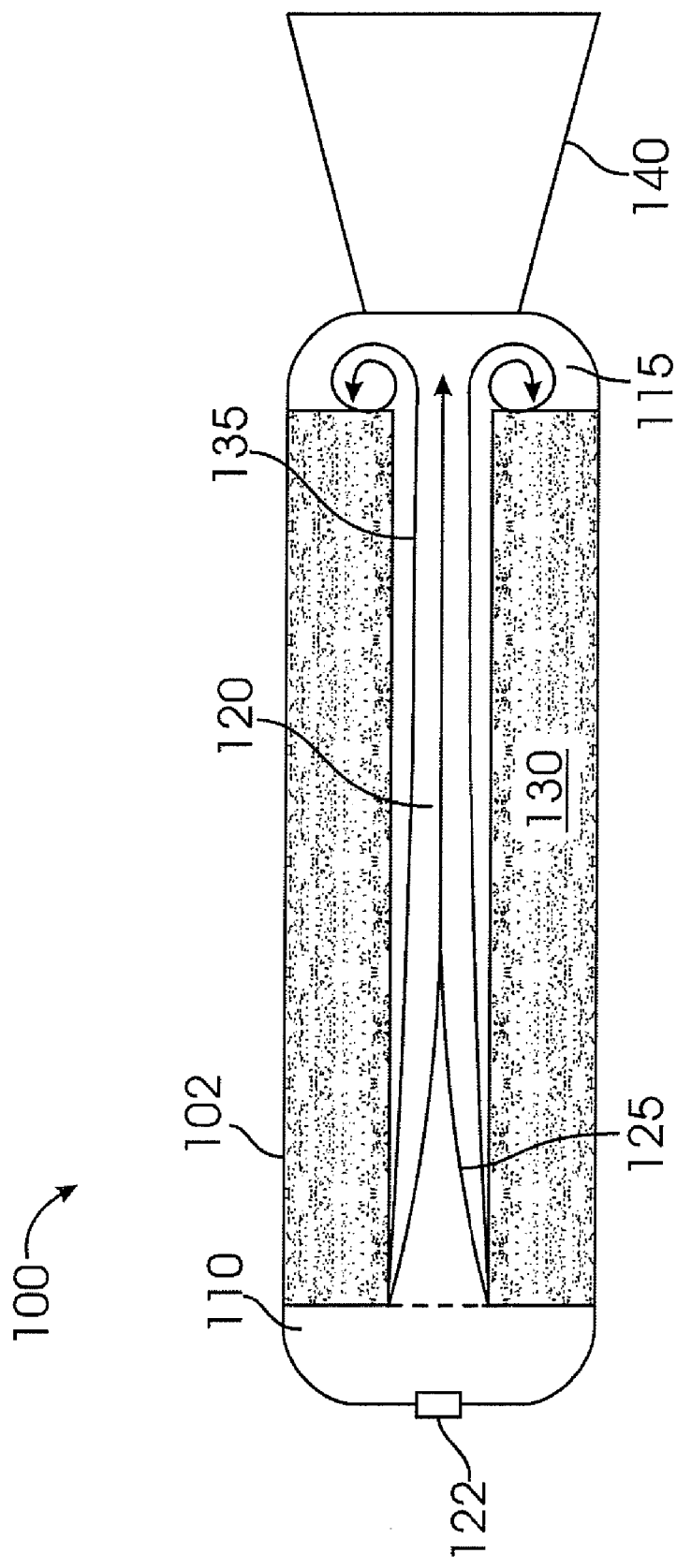
FIG. 1 shows a schematic of the configuration of a conventional, single port hybrid rocket motor.

FIG. 1 shows a schematic of the configuration of a conventional, single port hybrid rocket motor 100. The motor 100 generally includes a main tank or casing 102 that encloses a main chamber having a combustion chamber 110, a mixing chamber 115, and an elongate combustion port 120 extending therebetween. A solid fuel 130 is located within the main chamber. An injector 122 communicates with the combustion chamber 110 for injecting a liquid phase oxidizer into the combustion chamber 110. The oxidizer is located in a separate oxidizer tank.

In use, the oxidizer is injected into the combustion chamber 110 via the injector 122. The injected oxidizer is gasified and flows axially along the combustion port 120, forming a boundary layer edge 125 over the solid fuel 130. The boundary layer edge 125 is usually turbulent in nature over a large portion of the length of the combustion port 120. A diffusion flame zone 135 exists within the boundary layer edge 125, which diffusion flame zone 135 extends over the entire length of the solid fuel 130.

The heat generated in the flame, which is located approximately 20-30% of the boundary layer thickness above the fuel surface, is transferred to the wall mainly by convection. The wall heat flux evaporates the solid fuel 130 and the resultant fuel vapor is transported to the flame where it reacts with the oxidizer, which is transported from the free stream by turbulent diffusion mechanisms. The unburned fuel that travels beneath the flame, the unburned oxidizer in the free stream, and the flame combustion products mix and further react in the mixing chamber 115. The hot gases expand through a nozzle 140 to deliver the required thrust.

One or more oxidizer tanks are typically coupled to the casing 102. The oxidizer tanks contain oxidizer in a liquid phase. The oxidizer is transported from the tanks and enters the casing 102 through the injector 122. Combustion products emerge from the casing 102 through the nozzle 140 for generating thrust, as will be known to those skilled in the art. At least one igniter is coupled to the casing 102 for igniting the liquid fuel within a combustion chamber 110 of the casing 102, as described above.

It should be appreciated that the separate tanks for the oxidizer and the casing 102 can add to the cost of the system on several fronts. For example, it can be expensive and time consuming to manufacture and assemble the separate tanks.

Figure 2:
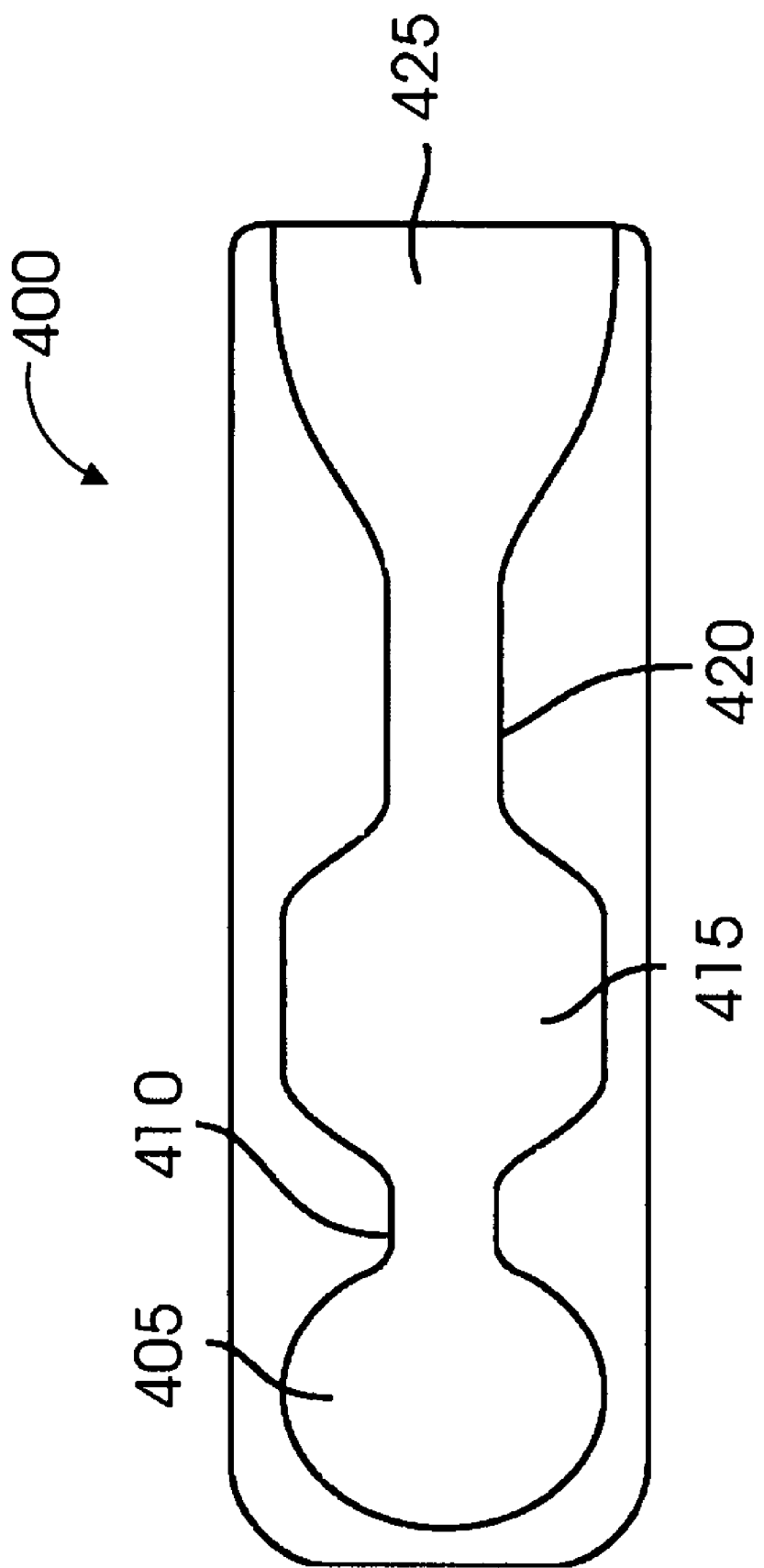
FIG. 2 shows a side, schematic view of a single-piece rocket motor.

FIG. 2 shows a side, schematic view of a single-piece rocket motor 400. In one embodiment, the motor 400 is formed from a single, prefabricated piece of material, such as, for example, by extrusion or injection molding. The casing, structure, oxidizer tank, combustion chamber, fuel, port and nozzle are all formed from a single piece of material, such as, for example, a material that can be used as solid rocket fuel. Acrylic and other plastics are suitable materials for manufacturing the motor 400, although it should be appreciated that other materials can be used. In another embodiment, the motor 400 is formed of multiple components that are all the same material. The components are then assembled to collectively form the motor 400.

With reference to FIG. 2, the motor 400 comprises several components, including an oxidizer tank 405, a valve port 410, a combustion chamber 415, a combustion port 420, and a nozzle 425. As mentioned, in one embodiment all of the components are manufactured of a unitary piece of material. In another embodiment, all of the components are formed of the same material but not as a unitary piece of material. The components are then assembled to form the motor.

The oxidizer tank 405 is formed by a cavity, such as a spherical cavity, that is contained within a first end of the motor 400. The cavity is configured to contain an oxidizer, such as, Nitrous Oxide (N₂O) or some other type of oxidizer for use as the liquid propellant. Those skilled in the art will appreciate that Nitrous Oxide is self-pressurizing at room temperature. Accordingly, the high vapor pressure of the Nitrous Oxide can be utilized in the oxidizer tank 405 to transport the Nitrous Oxide to the combustion chamber 415 via the valve port 410 without the use of pumps or a pressurization system. Those skilled in the art will appreciate that other types of liquid oxidizers can also be used.

The valve port 410 is sized to receive therein a valve and/or an injector that is used to regulate the flow of the oxidizer from the oxidizer tank 405 to the combustion chamber 415. A valve can be inserted into the valve port 410 in various manners. In one embodiment, one or more holes are formed (such as through drilling) through the outer wall of the valve port 410. The valve is then inserted into the valve port 410 through the holes, such as by mounting the valve at the tip of an acrylic screw and inserting the screwing the valve/screw into the valve port 410. One or more igniters can also be coupled to the combustion chamber 415 in a similar manner for igniting the liquid fuel within a combustion chamber 415 of the casing. The valve is not necessarily made of the same material as the remainder of the motor.

With reference still to FIG. 2, the combustion chamber 415 communicates with the valve port 410. The combustion chamber 415 is a cavity that is contained within the outer casing of the motor 400. As mentioned, the combustion chamber 415 is configured to contain combustion that occurs when the oxidizer is ignited by the igniter. The combustion port 420 leads off of the combustion chamber 415 and forms into the nozzle 425. The nozzle 425 has a predetermined geometry configured for hot gases expansion to deliver the required thrust.

In use, the oxidizer tank 405 is filled with a suitable oxidizer, such as Nitrous Oxide. As mentioned, the high vapor pressure of the Nitrous Oxide can be utilized in the oxidizer tank 405 to transport the Nitrous Oxide to the combustion chamber 415 via the valve port 410 without the use of pumps or a pressurization system. When the Nitrous Oxide enters the combustion chamber 415, combustion is initiated in the manner described above with respect to the conventional motor.

The resultant hot gases are expanded through the nozzle 425. Because the nozzle 425 itself is manufactured of the solid fuel material (such as acrylic), the size of the nozzle 425 expands as the motor burns. That is, at least a portion of the nozzle itself is burned and consumed because the nozzle is made of the solid fuel material. The initial flare of the nozzle 425 can be varied based on the altitude at which the motor is initially fired.

In another embodiment, the motor 400 is manufactured from a single material (such as acrylic) with the motor 400 having relatively thin walls. The whole motor 400 is then wrapped with an outer casing formed of a different material that provides structural strength to the motor 400. The wrapping material can be any type of suitable material, such as, for example, a composite such as carbon-epoxy.

A number of embodiments of the invention have been described. Nevertheless, it will be understood that various modifications may be made without departing from the spirit and scope of the invention. Accordingly, other embodiments are within the scope of the disclosure.

What is claimed:

1. A hybrid rocket system, comprising:
   a motor case having a proximal end and a distal end, the motor case defining an interior volume, the interior volume including:
   (a) a combustion chamber near a proximal end of the interior volume;
   (b) a first nozzle at a distal end of the interior volume;
   (c) a combustion port between the combustion chamber and the nozzle, wherein the combustion port is smaller in diameter than a diameter of the combustion chamber;
   (d) a spherical oxidizer tank at the proximal end of the interior volume, the oxidizer tank defining an internal cavity configured to hold a principal fluid oxidizer, the internal cavity larger in diameter than the diameter of the combustion port;
   (e) a valve port having a valve between the oxidizer tank and the combustion chamber, the valve port providing communication between the internal cavity of the oxidizer tank and the combustion chamber, wherein a hole extends through the motor case into the valve port, the hole sized to receive the valve therethrough for insertion into the valve port;

wherein the motor case, the oxidizer tank, and the valve port are all formed of the same material and wherein the material is a solid rocket fuel, the solid rocket fuel burns with the principal fluid oxidizer from the valve port for propulsion.

2. A hybrid rocket system as in claim 1, wherein the case, the oxidizer tank, and the valve port are manufactured of a unitary piece of material.

3. A hybrid rocket system as in claim 1, further comprising a fluid oxidizer in the internal volume of the oxidizer tank.

4. A hybrid rocket system as in claim 3, wherein the fluid oxidizer is Nitrous Oxide.

5. A hybrid rocket system as in claim 1, further comprising a valve located inside the valve port, wherein the valve is sized to fit through the hole that extends through the motor case.

6. A hybrid rocket system as in claim 1, wherein the material is acrylic.

* * * * *

UNITED STATES PATENT AND TRADEMARK OFFICE
CERTIFICATE OF CORRECTION

| | | |
|---|---|---|
| PATENT NO. | : 7,966,809 B2 | Page 1 of 1 |
| APPLICATION NO. | : 11/668829 | |
| DATED | : June 28, 2011 | |
| INVENTOR(S) | : Jim Benson | |

It is certified that error appears in the above-identified patent and that said Letters Patent is hereby corrected as shown below:

In the Specification

In Column 1, line 52, "Another type of rocket propulsion systems are the hybrid systems," should read --Other types of rocket propulsion systems include the hybrid systems,--.

Signed and Sealed this
Fourth Day of February, 2014

Michelle K. Lee
*Deputy Director of the United States Patent and Trademark Office*